(12) United States Patent
Shin et al.

(10) Patent No.: US 11,318,540 B1
(45) Date of Patent: May 3, 2022

(54) APPARATUS FOR PROCESSING GROOVE

(71) Applicants: HYUNDAI MOTOR COMPANY, Seoul (KR); KIA MOTORS CORPORATION, Seoul (KR)

(72) Inventors: Jae Man Shin, Seoul (KR); Jang Woo Yun, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/953,599

(22) Filed: Nov. 20, 2020

(30) Foreign Application Priority Data

Oct. 8, 2020 (KR) ........................ 10-2020-0130189

(51) Int. Cl.
 *B23B 29/034* (2006.01)
(52) U.S. Cl.
 CPC ... *B23B 29/03407* (2013.01); *Y10T 408/8598* (2015.01)
(58) Field of Classification Search
 CPC ............... B23B 29/03407; Y10T 408/8598
 See application file for complete search history.

(56) References Cited

U.S. PATENT DOCUMENTS

| 3,237,486 A | * | 3/1966 | Gilbert | .............. B23B 29/03435 408/3 |
| 6,367,359 B1 | * | 4/2002 | Ropos | ............... B23B 29/03467 82/1.4 |

FOREIGN PATENT DOCUMENTS

KR 10-1934691 B1 3/2019

* cited by examiner

*Primary Examiner* — Boyer D Ashley
*Assistant Examiner* — Reinaldo A Vargas Del Rio
(74) *Attorney, Agent, or Firm* — McDonnell Boehnen Hulbert & Berghoff LLP (57) ABSTRACT

An apparatus for processing a groove on an interior circumference of a cylinder bore may include, a holder formed with bolt holes on a lower surface, a frame having a fixing end, a mounting end, and a supporting end, the fixing end being formed with slots corresponding to the bolt holes, an inner slip ring mounted on an exterior circumference of a lower end portion of the holder and connected an electrical cable, an outer slip ring externally installed on the inner slip ring allowing a slip, a motor mounted on the mounting end of the frame, connected to the inner slip ring through the electrical cable, and having a rotation shaft rotatably supported by the mounting end and the supporting end, and a cutting tip coupled with the rotation shaft of the motor through a tip holder mounted on the rotation shaft.

5 Claims, 7 Drawing Sheets

APPARATUS FOR PROCESSING GROOVE

CROSS REFERENCE TO RELATED APPLICATIONS

This application claims priority to and the benefit of Korean Patent Application No. 10-2020-0130189 filed in the Korean Intellectual Property Office on Oct. 8, 2020, the entire contents of which are incorporated herein by reference.

BACKGROUND

(a) Field

The present disclosure relates to an apparatus for processing a groove.

(b) Description of the Related Art

In general, the cylinder bore (or cylinder liner) of an engine secures a certain level of surface roughness in interior circumference through honing processing. As such, a honing-processed cylinder bore has a mesh pattern in the form of a mesh on the interior circumference, and an oil film is formed on an interior circumference of a cylinder bore by this mesh pattern, to minimize friction with a piston ring in reciprocal movement.

Meanwhile, when the piston motion along the cylinder bore continues, deformation may occur in the mesh pattern. This deformation causes the oil to be swiped on the interior circumference of the cylinder bore during the piston motion, to increase friction between the piston ring and the cylinder bore, causing deterioration of engine efficiency.

This problem may be solved by forming an oil-filled groove (e.g., a groove of 10 μm or less) in the interior circumference of the honed cylinder bore.

The method of processing such a groove on the interior circumference of the cylinder bore is generally divided into a laser processing method and a mechanical processing method.

The laser processing method is a method of processing grooves on the interior circumference of the cylinder bore using pulse laser after the honing processing. This laser processing method may be difficult to install since equipment for the laser processing is generally large in size and volume, as well as expensive. In addition, it may be difficult to form the depth of the groove in sufficient uniformity, due to fine output change of the laser beam.

The mechanical processing method is a method of physically forming a groove on the interior circumference of the cylinder bore using a cutting tip after inserting a cutting tool into the honing-processed cylinder bore. According to a mechanical processing method, a cutting tip is rotated by a motor while a rotation shaft of a cutting tool is precisely aligned with a central axis of the cylinder bore, and thereby a uniform depth of grooves are formed on the interior circumference of the cylinder bore.

However, according to the mechanical processing method where the groove is cut on the interior circumference of the cylinder bore by using a cutting tip, a dedicated tool must be prepared for each cylinder bore having various interior diameters, preparation and maintenance is difficult due to complexity in configuration, and installation cost is high.

The above information disclosed in this Background section is only for enhancement of understanding of the background of the disclosure, and therefore it may contain information that does not form the prior art that is already known in this country to a person of ordinary skill in the art.

SUMMARY

An exemplary apparatus for processing a groove of predetermined depth on an interior circumference of a cylinder bore. The exemplary apparatus may include a holder, a frame, an inner slip ring, an outer slip ring, a motor, and a cutting tip. The holder may be fixable to a main shaft of a machining center and formed with bolt holes on a lower surface. The frame may have a fixing end formed at an upper portion and formed with slots corresponding to the bolt holes, a mounting end at a central portion, and a supporting end at a lower portion, where the fixing end, the mounting end, and the supporting end being formed toward a same direction. The inner slip ring may be mounted on the holder by being fitted to an exterior circumference of a lower end portion of the holder and may be connected an electrical cable to transmit electrical power. The outer slip ring may be installed in contact with an outer circumference of the inner slip ring allowing a slip, and may be connected to a cable to receive an electrical power. The motor may be mounted on a front end of the mounting end of the frame in a downward direction, may be connected to the inner slip ring through the electrical cable to receive electrical power, and may have a rotation shaft rotatably supported by the mounting end and the supporting end of the frame. The cutting tip may be coupled with the rotation shaft of the motor through a tip holder mounted on a lower end surface of the rotation shaft.

The rotation shaft may be rotatably supported by the mounting end through a bearing.

The rotation shaft may be rotatably supported by the supporting end through a bearing.

An exemplary apparatus may further include a fine position adjustment unit of a rack and pinion structure configured between the lower surface of the holder and the fixing end of the frame, such that a position of the cutting tip with respect to a central axis of the holder may be finely adjusted.

The fine position adjustment unit may include a rack formed on the lower surface between the bolt holes on the holder, and a pinion engaged with the rack and rotatably installed in an interior space between the slots of the fixing end of the frame.

The pinion may be formed with a wrench recess on an exterior exposed surface.

The pinion may be rotatably supported by a snap ring.

According to an apparatus for processing a groove according to an exemplary embodiment, when the groove processing targets are cylindrical, the radius of the cutting tip with respect to the central axis of the holder may be changed depending on the processing targets even if the processing targets have different sizes of interior diameters. In addition, the cutting depth of the grooves to be processed may be finely adjusted by the fine position adjustment unit.

In addition, an apparatus for processing a groove according to an exemplary embodiment is easy to manufacture and repair due to its simple configuration, and easy to control, so as to be applied to processing of processing targets that require oil groove processing for reducing friction, for example, cylinder bores, cylinder liners, and any other cylindrical objects.

Other effects that may be obtained or are predicted by an exemplary embodiment will be explicitly or implicitly described in a detailed description of the present disclosure.

That is, various effects that are predicted according to an exemplary embodiment will be described in the following detailed description.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

Figure 1:
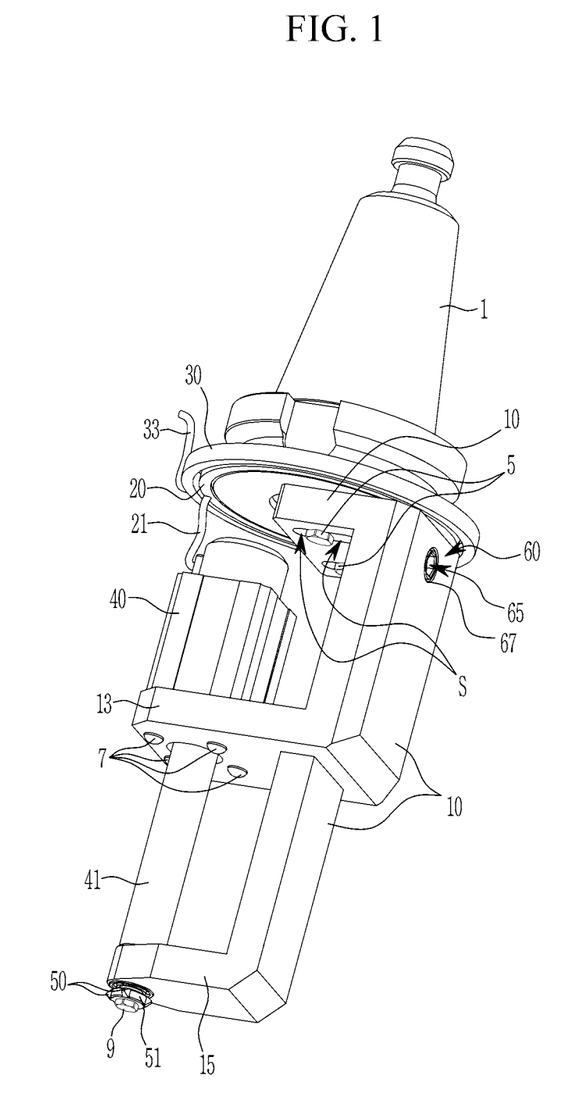
FIG. 1 is a perspective view of an apparatus for processing a groove according to an exemplary embodiment.
Figure 2:
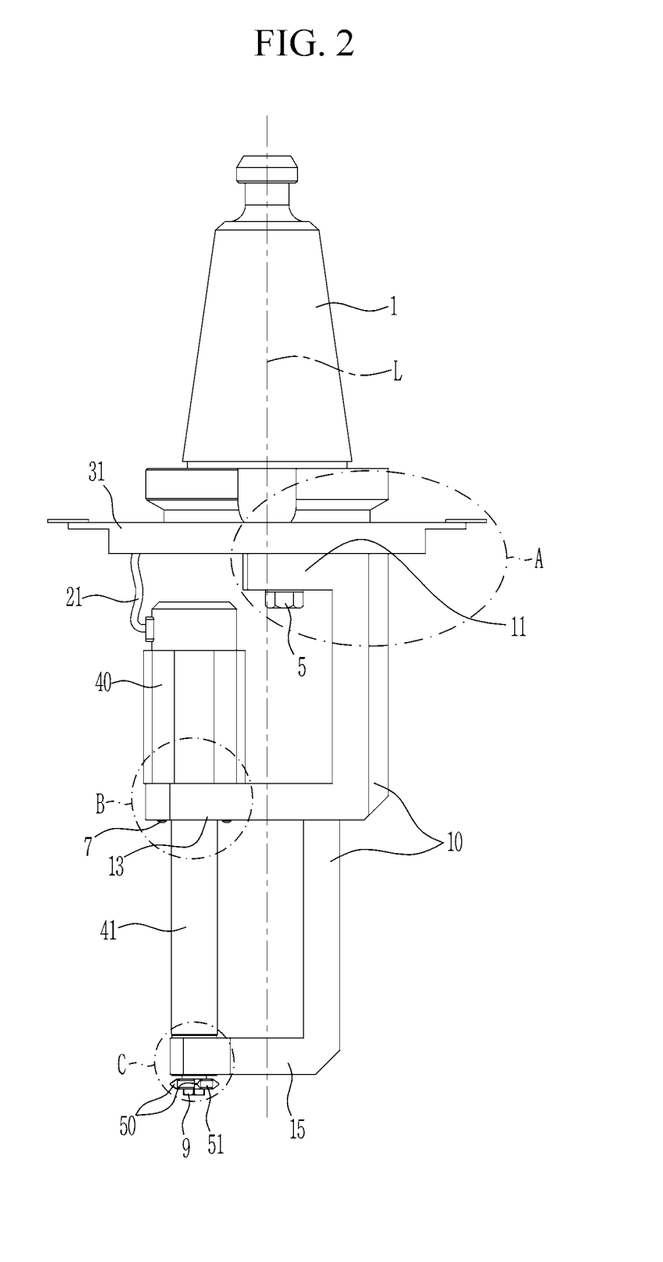
FIG. 2 is a lateral view of an apparatus for processing a groove according to an exemplary embodiment.
Figure 3:
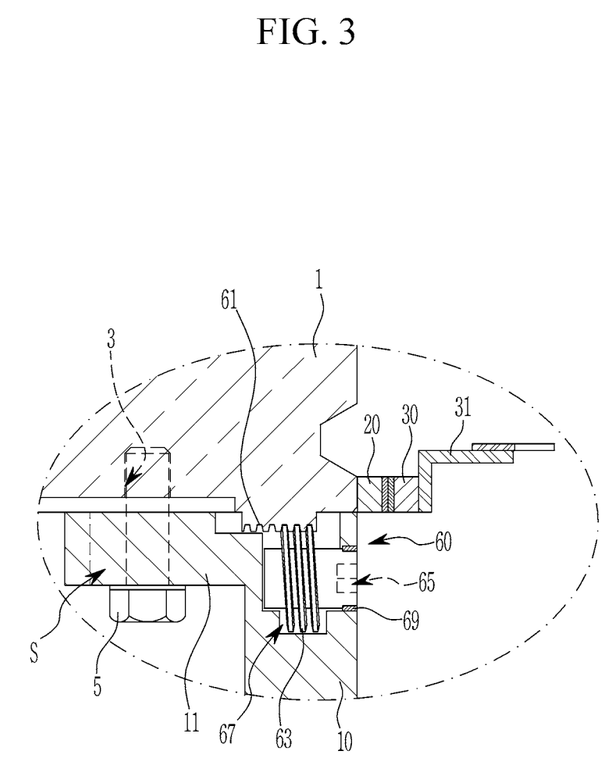
FIG. 3 is an enlarged cross-sectional view of the portion A in FIG. 2.
Figure 4:
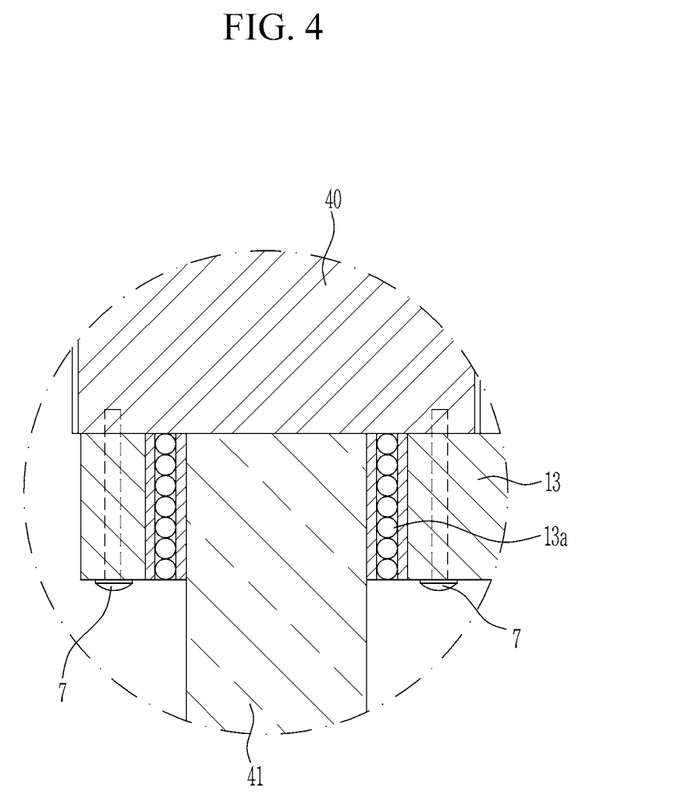
FIG. 4 is an enlarged cross-sectional view of the portion B in FIG. 2.
Figure 5:
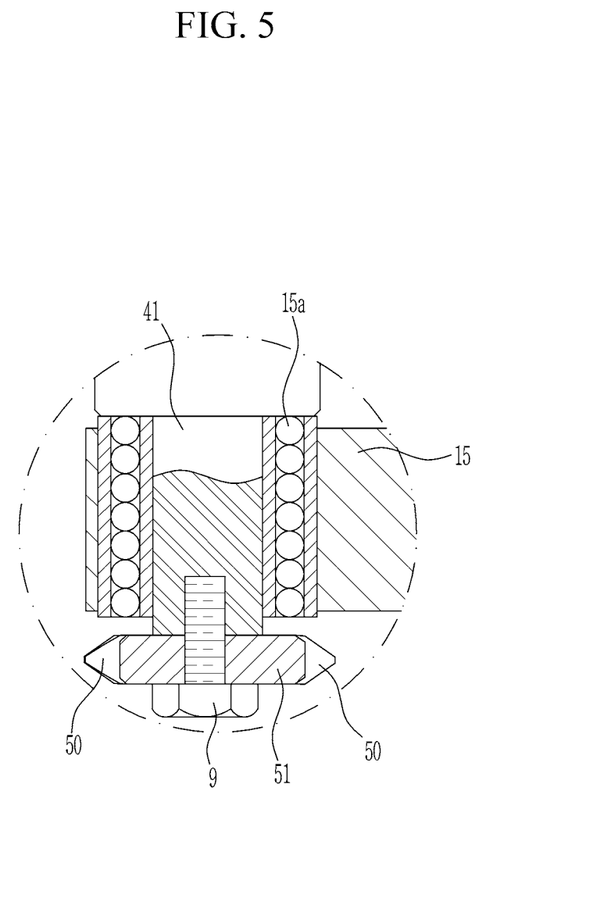
FIG. 5 is an enlarged cross-sectional view of the portion C in FIG. 2.

FIG. 1 is a perspective view of an apparatus for processing a groove according to an exemplary embodiment. FIG. 2 is a lateral view of an apparatus for processing a groove according to an exemplary embodiment. FIG. 3 is an enlarged cross-sectional view of the portion A in FIG. 2. FIG. 4 is an enlarged cross-sectional view of the portion B in FIG. 2. FIG. 5 is an enlarged cross-sectional view of the portion C in FIG. 2.

An apparatus for processing a groove according to an exemplary embodiment is for cutting a groove on an interior circumference of a cylinder bore, which is fixed on a main shaft of a machining center, and is configured to cut a groove functioning as an oil groove formed on the interior circumference of the cylinder bore by a cutting tip rotated by a torque driven by a motor.

Here, the apparatus for processing a groove is described to process a groove on the interior circumference of the cylinder bore, but is not limited thereto, and the processing target is not limited if the target is in a shape of a circular pipe having a circular interior circumference.

Referring to FIG. 1 and FIG. 2, an apparatus for processing a groove according to an exemplary embodiment includes a holder 1, a frame 10, an inner slip ring 20, an outer slip ring 30, a motor 40, and a cutting tip 50.

Figure 6A:
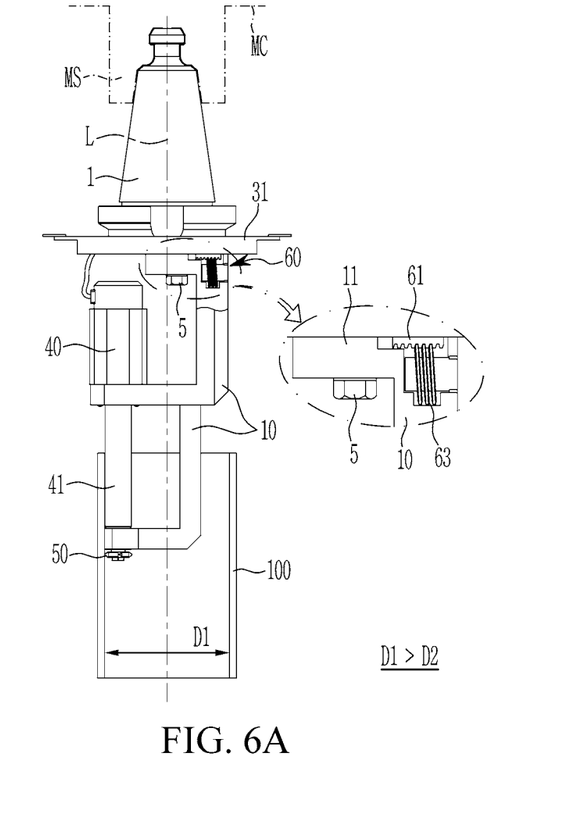
FIGS. 6A and 6B are state diagrams of a fine position adjustment unit applied to an apparatus for processing a groove according to an exemplary embodiment.

The holder 1 is fixed to a main shaft MS of a machining center MC through an upper end portion (refer to FIG. 6), and a bolt hole 3 (refer to FIG. 3) is formed on a lower surface, symmetrically at both sides with respect to central line of the frame 10. Although FIG. 3 illustrate only one bolt hole 3, it may be understood that the two bolt holes 3 are formed at positions corresponding to bolts 5 described later (refer to FIG. 1).

The frame 10 is formed with a fixing end 11 at an upper portion, a mounting end 13 at a central portion, and a supporting end 15 at a lower portion. That is, the fixing end 11, the mounting end 13, and the supporting end 15 are formed toward the same direction.

The fixing end 11 forms slots S each corresponding to the bolt hole 3 formed on the lower surface of the holder 1. The slot S is formed in a direction along which the fixing end 11 extends.

The motor 40 is mounted on a forward end portion of the mounting end 13, and the supporting end 15 is configured to rotatably support a rotation shaft 41 of the motor 40.

The frame 10 is coupled with the lower surface of the holder 1, by bolts 5 engaged with the bolt holes 3 through the slots S of the fixing end 11, and thereby, the position of frame 10 mounted on the lower surface of the holder 1 is adjustable with respect to a central axis L of the holder 1, due to the length of the slots S.

The inner slip ring 20 is mounted on the holder 1 by being fitted to an exterior circumference of a lower end portion of the holder 1. In order to supply an electrical power to the motor 40, the inner slip ring 20 is connected to the motor 40 through an electrical cable 21.

In addition, the outer slip ring 30 is in contact with an outer circumference of the inner slip ring 20 allowing a slip therebetween, and is fixed to the exterior case (not shown) on the main shaft MS through a fixing cover 31. In addition, in order to supply the electrical power to the motor 40, the outer slip ring 30 is connected to an electrical power source through a cable 33.

The motor 40 is installed downward on the front end of the mounting end 13 of the frame 10 and is connected to the inner slip ring 20 through the cable 21 to receive electrical power. Here, the motor 40 is disposed downward on the mounting end 13 and is fixed by a plurality of bolts 7 penetrating the mounting end 13.

The motor 40 is rotation controlled by receiving power from a controller through the cable 33, the outer slip ring 30, the inner slip ring 20, and the cable 21, and may be a servo-motor capable of controlling rotation speed and rotating direction.

The rotation shaft 41 of the motor 40 is rotatably supported by the mounting end 13 and the supporting end 15 of the frame 10, respectively. At this time, as shown in FIG. 4, the rotation shaft 41 is rotatably supported by a forward end portion of the mounting end 13 through a bearing 13a. In addition, as shown in FIG. 5, the rotation shaft 41 is rotatably supported by a forward end portion of the supporting end 15 through a bearing 15a.

In addition, the cutting tip 50 is coupled with the rotation shaft 41 of the motor 40, by a bolt 9 through a tip holder 51. At this time, the cutting tip 50 may be integrally formed with the tip holder 51, or may be assembled with the tip holder 51.

That is, the cutting tip 50 may be replaced, separately or together with the tip holder 51, when the life is over due to wear, etc.

In the above, the inner slip ring 20 and the outer slip ring 30 eccentrically coupled with respect to the main shaft MS of the machining center MC, while stably suppling a control current to the motor 40.

That is, while the inner slip ring 20 fixed to the holder 1 rotates with the holder 1, the inner slip ring 20 slips with respect to the outer slip ring 30 fixed to the fixing cover 31.

Referring to FIG. 3, according to an apparatus for processing a groove according to an exemplary embodiment, a fine position adjustment unit 60 of a rack and pinion structure is configured between the lower surface of the holder 1 and the fixing end 11 of the frame 10, such that a position of the cutting tip 50 with respect to the central axis L of the holder 1 may be finely adjusted.

In the fine position adjustment unit 60, a rack 61 is formed on the lower surface between the bolt holes 3 on the holder 1, and a pinion 63 engaged with the rack 61 is rotatably installed in an interior space 67 between the slots S of the fixing end 11 of the frame 10.

At this time, the rack 61 is formed in parallel with the slots S formed on the fixing end 11 of the frame 10.

In addition, the pinion 63 is formed with a wrench recess 65, e.g., hexahedral recess, on an exteriorly exposed surface, i.e., on a surface facing an outside, such that the pinion 63 may be rotated by a wrench tool to adjust the relative position along the rack 61.

Here, the pinion 63 is installed in the interior space 67 formed in the fixing end 11 of the frame 10, with the wrench recess 65 located toward an exterior of the frame 10, and rotatably supported by a snap ring 69.

That is, according to the fine position adjustment unit 60, when the pinion 63 is rotated by a wrench tool, the pinion 63 moves along the rack 61 by the rotation, and thereby the frame 10 moves together with the cutting tip 50 with respect to the central axis L of the holder 1, by which the position of the cutting tip 50 is finely adjusted.

Figure 6B:
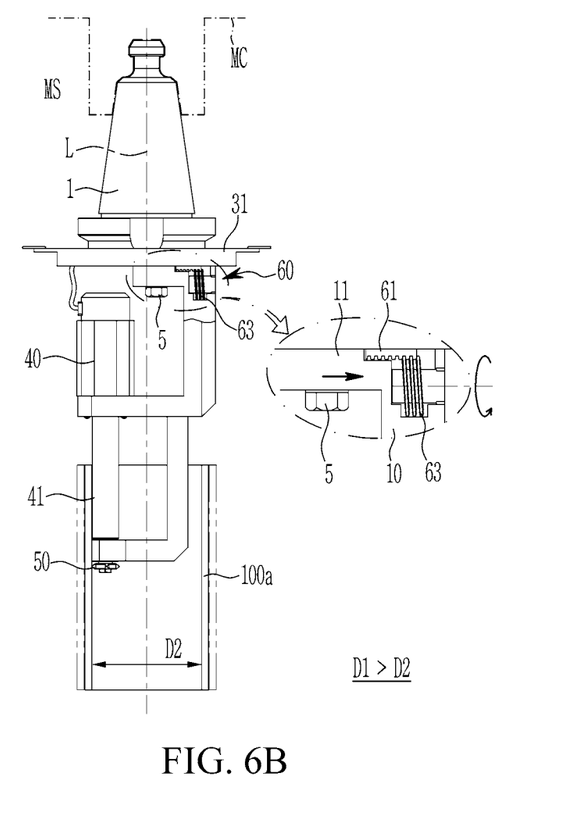

FIGS. 6A and 6B illustrate state diagrams of a fine position adjustment unit applied to an apparatus for processing a groove according to an exemplary embodiment.

Hereinafter, an exemplary usage of an apparatus for processing a groove according to an exemplary embodiment is described in detail.

First, factors that need to be controlled in groove processing for a processing target, in this example, the interior circumference of the cylinder bore, are described.

In order to groove processing the interior circumferences of cylinder bores 100 and 100a whose interior diameter sizes are determined, it is necessary to determine the cutting depth. In order to satisfy the processing condition for this cutting depth, the rotation radius of the tool (In this exemplary embodiment, a rotation radius of the cutting tip 50 with respect to the rotation shaft 41 of the motor 40) needs to be determined. That is, the tool size processing the groove pattern should be decided first.

In addition, in order to cut grooves of a predetermined radius with a uniform spacing, a rotation speed of the cutting tip 50, interior diameters of the cylinder bores 100 and 100a, and a feeding value of the rotation shaft 41 of the motor 40 should be determined. Here, the feeding value may be a revolving speed of the rotation shaft 41 by the rotation of the main shaft MS of the machining center MC, and/or a moving speed of the main shaft MS into the bores 100 and 100a. Since the feeding value of the rotation shaft 41 of the motor 40 depends on the distance of the rotation shaft 41 of the motor 40 from the main shaft MS of the machining center MC, the evolving speed of the rotation shaft 41, i.e., the rotation speed of the main shaft may be calculated.

That is, by separately controlling the evolving speed of the rotation shaft 41 (i.e., the rotation speed of the main shaft MS) and the rotation speed of the rotation shaft 41, a groove pattern having a desired size and spacing may be processed on the interior circumferences of the cylinder bores 100 and 100a.

As shown in FIG. 6A, an exemplary apparatus for processing a groove may process a plurality of grooves on the interior circumference of the cylinder bore 100 having an interior diameter D1.

While the cutting tip 50 enters the cylinder bore 100 to reach a processing starting point, the rotation shaft 41 of the motor is oriented to a neutral position to avoid scratching the interior circumference by the cutting tip 50. The neutral position may be a position where the plurality of cutting tips 50 are aligned innermost according to the rotation of the rotation shaft 41 of the motor 40.

Thereafter, the motor 40 is driven by applying the electrical power, the cutting tip 40 rotates to process the grooves while moving from the starting point to a finishing point according to a programmed moving speed, i.e., according to the programmed rotation speed of the main shaft MS of the machining center MC.

Meanwhile, as shown in FIG. 6B, in order to process grooves on the interior circumference of the cylinder bore 100a having an interior diameter D2 (D1>D2), the position of the cutting tip 50 with respect to the central axis L of the holder 1 should be moved toward the central axis L direction, which is finely adjusted according to an exemplary embodiment.

First, the bolt 5 for fixing the fixing end 11 of the frame 10 to the lower surface of the holder 1 is loosen, and then the position of the cutting tip 50 is finely adjusted by using the fine position adjustment unit 60. That is, while the pinion 63 is finely rotated by using a wrench tool, the position of the frame 10 mounted with the cutting tip 50 is finely adjusted with respect to the central axis L of the holder 1, and then the bolt 5 are fastened to fix the frame 10 to the holder 1.

In this state, a groove is processed on the interior circumference of the cylinder bore 100a having the interior diameter D2, in the same way as described above.

Therefore, according to an apparatus for processing a groove according to an exemplary embodiment, when the groove processing targets are cylindrical, the radius of the cutting tip 50 with respect to the central axis L of the holder 1 may be changed depending on the processing targets even if the processing targets has different sizes of interior diameters. In addition, the cutting depth of the grooves to be processed may be finely adjusted by the fine position adjustment unit 60.

In addition, an apparatus for processing a groove according to an exemplary embodiment is easy to manufacture and repair due to its simple configuration, and easy to control, so as to be applied to processing of processing targets that require oil groove processing for reducing friction, for example, cylinder bores 100 and 100a, cylinder liners, and any other cylindrical objects.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for processing a groove of a predetermined depth on an interior circumference of a cylinder bore, the apparatus comprising:
   a holder fixable to a main shaft of a machining center and formed with bolt holes on a lower surface;
   a frame having a fixing end formed at an upper portion, the fixing end being formed with slots corresponding to the bolt holes, a mounting end at a central portion, and a supporting end at a lower portion, where the fixing end, the mounting end, and the supporting end are formed toward a same direction;

an inner slip ring mounted on the holder by being fitted to an exterior circumference of a lower end portion of the holder, and connected an electrical cable to transmit electrical power;

an outer slip ring positioned in contact with an outer circumference of the inner slip ring allowing a slip, and connected to a cable to receive an electrical power;

a motor mounted on a front end of the mounting end of the frame in a downward direction, connected to the inner slip ring through the electrical cable to receive electrical power, and having a rotation shaft rotatably supported by the mounting end and the supporting end of the frame;

a cutting tip coupled with the rotation shaft of the motor through a tip holder mounted on a lower end surface of the rotation shaft; and a fine position adjustment unit of a rack and pinion structure configured between the lower surface of the holder and the fixing end of the frame, such that a position of the cutting tip with respect to a central axis of the holder can be finely adjusted;

wherein the fine position adjustment unit comprises:
a rack formed on the lower surface between the bolt holes on the holder; and
a pinion engaged with the rack and rotatably installed in an interior space between the slots of the fixing end of the frame.

2. The apparatus of claim 1, wherein the rotation shaft is rotatably supported by the mounting end through a bearing.

3. The apparatus of claim 1, wherein the rotation shaft is rotatably supported by the supporting end through a bearing.

4. The apparatus of claim 1, wherein the pinion is formed with a wrench recess on an exterior exposed surface.

5. The apparatus of claim 1, wherein the pinion is rotatably supported by a snap ring.

* * * * *